April 8, 1958 A. L. SEGELHORST ET AL 2,829,674
AUTOMATIC FLUID CONTROL MEANS
Filed June 11, 1954

INVENTORS
AUGUST L. SEGELHORST
WARREN W. STOKES
BY
*Mason & Graham*
ATTORNEYS 2,829,674

AUTOMATIC FLUID CONTROL MEANS

August L. Segelhorst, Santa Barbara, and Warren W. Stokes, Taft, Calif.

Application June 11, 1954, Serial No. 436,063

3 Claims. (Cl. 138—45)

This invention has to do with fluid control devices generally, and more particularly with devices which are responsive to changes in fluid pressure in a manner to regulate the flow of fluid. This application is a continuation in part of our application Serial No. 31,473, filed June 7, 1948, for Automatic Fluid Control Means, now Patent No. 2,685,891.

While the invention disclosed herein may have numerous other applications, the invention is particularly designed for use in connection with producing oil wells as a means for controlling and regulating the flow of fluid from a well to maintain a desired ratio of oil and gas in a flowing or pumping well. It is well known that in wells which flow under the influence of natural gas pressure it is necessary to regulate or check the flow of fluid from the well in order to obtain maximum output of oil with relation to the gas produced or, in other words, to maintain an efficient ratio of oil to gas in the fluid produced. If the well is allowed to flow too fast, the gas is apt to channel the oil sands, bring sand into the well, and escape without performing its useful function of raising the optimum quantity of oil. On the other hand, if the flow of fluid from the well is checked or maintained at too low a rate, there is a danger of the well overloading; that is, there will come to be too large a proportion of oil or water in the well which has not absorbed or is not mixed with a sufficient quantity of gas to lighten the column of fluid with the result that in many cases the well will fail to flow at reduced bottom hole pressures. It is also known, of course, that the bottom hole pressures in a well vary greatly from time to time, and the well often surges as a result of sudden influxes of gas or oil under high pressure. In view of this it is therefore necessary from time to time to adjust the rate of flow in order to compensate for the changing conditions in the well.

It is also desirable to regulate the flow of fluid from wells being pumped in order to maintain a relatively constant flow and prevent intermittent flow which might otherwise take place.

An object of this invention is to provide means for automatically controlling the flow of fluid from a well in response to changes in pressure of the fluid in order to maintain the well in production at the desired ratio of oil to gas.

A particular object of the invention is to provide a device adapted to be connected in a pipe line or the like which will permit only limited flow of fluid under conditions of high pressure and which will permit greater flow of fluid when the pressure in the pipe line drops below a predetermined point.

It is a further object of the invention to provide a fluid control means which at all times provides a relatively small orifice for the flow of fluid therethrough and which is responsive to changes in pressure to vary the effective orifice area gradually, depending upon the pressure to which the device is subjected.

More particularly it is an object to provide a valve having a valve element and means for resiliently urging the element to an open position in which the valve element, when closed, permits limited flow of fluid therethrough and which, when open, offers less restriction to flow.

These and other objects will be apparent from the drawings and following description thereof. Referring to the drawings.

Figure 1:
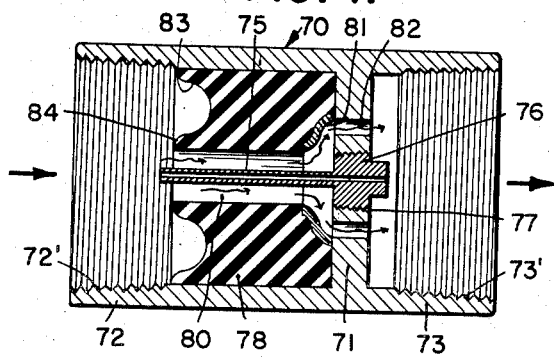
Fig. 1 is a longitudinal sectional view through a form of device embodying the invention.
Figure 2:
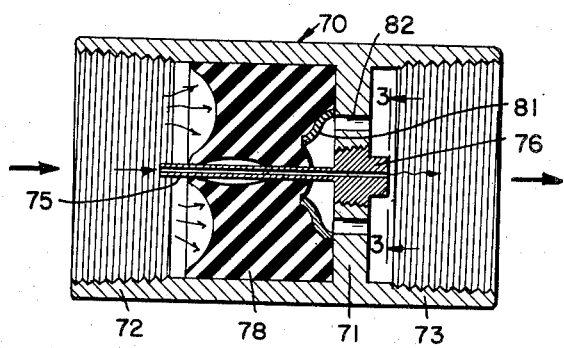
Fig. 2 is a view similar to Fig. 1 showing the relationship of the parts when subjected to high pressure.
Figure 3:
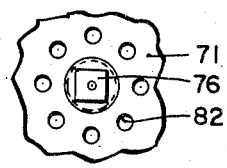
Fig. 3 is an enlarged fragmentary cross section on line 3—3 of Fig. 2.

More particularly describing the invention, referring first to Figs. 1–3, a tubular casing 70 is provided which has a partition 71 dividing the casing into an inlet section 72 and an outlet section 73, the sections being screw threaded at 72' and 73' so that the device may be connected in a pipe line or the like. Mounted centrally of the partition is a tube 75 having an externally threaded enlargement 76 which is received in a threaded hole 77 in the partition. This tube provides communication between the inlet and outlet sections of the device at all times irrespective of the relative pressure of the fluid on opposite sides of the partition.

In the inlet section and surrounding the tube there is provided a resilient means, such as the annular member 78, which may be formed of a suitable oil resistant resilient material, such as a synthetic rubber or the like. This member has a normal internal passage or opening 80 which is of considerably greater diameter than the outer diameter of the tube 75. This passage, when in the position in which the parts are shown in Fig. 1, also furnishes communication between the inlet section of the valve and the outlet section through the medium of a plurality of openings 82 in the partition. At its inlet end the annular member 78 is provided with a circumferential groove or concave leading edge 83 providing an inner annular lip 84.

We also provide a rigid guard ring 81 at the inner end of member 78 to prevent that member from flowing into holes 82 in partition 71 under high pressure with consequent possibility of remaining there when the pressure lowers.

In the operation of this device, when the well pressure is not excessive, fluid is free to flow through the passage 80, openings 82 and also through the tube 75. However, when the pressure in the inlet section of the device builds up, the annular member 78 is correspondingly deformed inwardly into or nearly into engagement with the tube 75, thereby reducing or closing the passage 80, as shown in Fig. 2, with the result that until the pressure drop sufficiently, flow of fluid through the device can only take place through the tube 75 or only a limited amount through the passage 80, and the capacity of the device is greatly restricted.

It will be apparent that the effective size of the bleeder passage may be varied by having a series of different-sized tubes 75 and utilizing a selected one. It should also be apparent that the hardness of the annular member or its internal diameter may be varied to meet given conditions. The external diameter of the tube may be varied also, as by adding a sleeve thereto, in order to adjust the size of the passage through the member 78.

Figure 4:
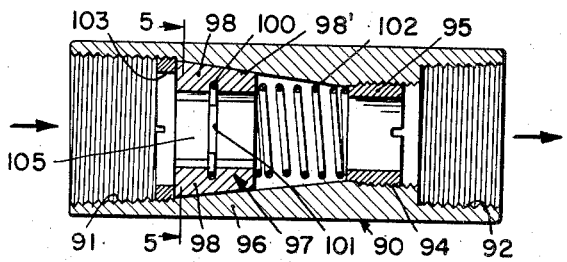
Fig. 4 is a longitudinal sectional view through another form of the invention.
Figure 5:
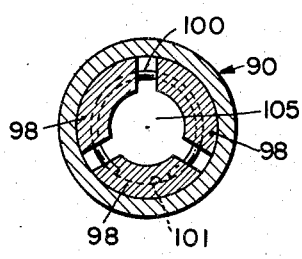
Fig. 5 is a section on line 5—5 of Fig. 4.

In Figs. 4 and 5 there is shown another form of the invention which in operation is generally similar to that shown in Figs. 1–3. In this form of the invention a tubular member 90 is provided which is internally threaded at each end at 91 and 92 so that the device may be mounted in a pipe line. The tubular member 90 is also provided with an internal threaded section 94 in which is mounted a retainer ring 95. The inner wall of the member 90 is provided with a section 96 which converges in a direction toward the outlet. Mounted in the member 90 in the region of the cam surface 96 is an annular means 97 formed of segments 98, each of which has a tapered outer surface 98' corresponding generally to the section 96. These elements are held in expanded position by means of internal spring 100 mounted in grooves 101, and are resiliently urged toward the inlet end of the device by compression spring 102. The force of the spring may be varied by adjusting the position of the retainer ring 95. An end ring 103 is provided for maintaining the segments 97 in the member 90.

The annular means 97, when in expanded position, provides a plurality of passages including a central passage 105 for the passage of fluid therethrough. It will be apparent that as the pressure on the inlet side of the device rises this and the resulting high velocity flow of fluid forces the segmented means 97 toward the retainer ring 95 and the individual segments are cammed inwardly toward each other by the section 96, thereby reducing the effective cross-sectional passage area available for fluid flow.

Although the invention has been particularly shown and described, it is contemplated that various changes and modifications may be made without departing from the scope thereof as indicated by the following claims.

We claim:

1. A fluid regulator adapted for connection in a pipe line or the like comprising a hollow body having an inlet passage and an outlet passage, a partition wall intermediate said passages, said wall having a fluid port therethrough, a tube mounted in said wall and extending for a substantial distance into said inlet passage, said tube providing a bleeder passage of restricted cross-sectional area affording communication to opposite sides of said partition wall, and a resilient annular member surrounding said tube in the inlet passage and normally providing a passageway through its center between it and said tube whereby fluid may flow through the annular member to said port in said partition wall, said annular member being deformable under the influence of relatively great pressure in the inlet passage to restrict the passageway through the same.

2. A fluid regulator adapted for connection in a pipe line or the like comprising a hollow body having an inlet passage and an outlet passage, a partition wall intermediate said passages, said wall having a plurality of circumferentially spaced ports in said partition wall, a tube mounted in said partition wall centrally of said ports and extending for a substantial distance into said inlet passage, said tube providing a bleeder passage to opposite sides of said partition wall, a resilient annular member surrounding said tube in the inlet passage and normally providing a passageway through its center between it and said tube whereby fluid may flow through the annular member to said port in said partition wall, said annular member being deformable under the influence of relatively great pressure in the inlet passage to restrict the passageway through the same, and a guard ring between said ports and the inner end of said annular member preventing said member from impinging upon said ports.

3. A fluid regulator adapted for connection in a pipe line or the like comprising a hollow body having an inlet passage and an outlet passage, a partition wall intermediate said passages, said wall having a fluid port therethrough, a tube mounted in said wall and extending for a substantial distance into said inlet passage, said tube providing a bleeder passage of restricted cross-sectional area affording communication to opposite sides of said partition wall, and a resilient annular member surrounding said tube in the inlet passage and normally providing a passageway through itself whereby fluid may flow through the annular member to said port in said partition wall, said annular member being deformable under the influence of relatively great pressure in the inlet passage to restrict the passageway through the same.

References Cited in the file of this patent

UNITED STATES PATENTS

| | | |
|---|---|---|
| 2,168,116 | Crites et al. | Aug. 1, 1939 |
| 2,198,487 | Sisk | Apr. 23, 1940 |
| 2,224,216 | Coberly | Dec. 10, 1940 |
| 2,374,922 | Byrd | May 1, 1945 |
| 2,444,677 | Rosenblum | July 6, 1948 |
| 2,515,073 | Binnall et al. | July 11, 1950 |
| 2,685,891 | Segelhorst et al. | Aug. 10, 1954 |